United States Patent
Zhang et al.

(10) Patent No.: US 12,362,876 B2
(45) Date of Patent: *Jul. 15, 2025

(54) USING APERIODIC REFERENCE SIGNALS FOR A SPATIAL RELATIONSHIP UPDATE

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Irvine, CA (US); Hong He, Cupertino, CA (US); Huaning Niu, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, San Diego, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 651 days.

This patent is subject to a terminal disclaimer.

(21) Appl. No.: 17/437,571

(22) PCT Filed: Sep. 16, 2020

(86) PCT No.: PCT/CN2020/115495
§ 371 (c)(1),
(2) Date: Sep. 9, 2021

(87) PCT Pub. No.: WO2022/056702
PCT Pub. Date: Mar. 24, 2022

(65) Prior Publication Data
US 2022/0303086 A1  Sep. 22, 2022

(51) Int. Cl.
*H04L 5/00* (2006.01)
*H04W 24/08* (2009.01)
*H04W 72/044* (2023.01)

(52) U.S. Cl.
CPC .......... *H04L 5/0048* (2013.01); *H04W 24/08* (2013.01); *H04W 72/046* (2013.01)

(58) Field of Classification Search
None
See application file for complete search history.

(56) References Cited

U.S. PATENT DOCUMENTS

| | | | | |
|---|---|---|---|---|
| 2019/0335427 A1* | 10/2019 | Sun | ........................ | H04W 24/10 |
| 2019/0356379 A1* | 11/2019 | Takeda | .................... | H04B 7/088 |

(Continued)

FOREIGN PATENT DOCUMENTS

| | | |
|---|---|---|
| CN | 107347218 A | 11/2017 |
| CN | 108207017 | 6/2018 |

(Continued)

OTHER PUBLICATIONS

International Search Report for PCT Patent Application No. PCT/CN2020/115495; May 31, 2021.

(Continued)

*Primary Examiner* — Christopher T Wyllie
(74) *Attorney, Agent, or Firm* — Kowert, Hood, Munyon, Rankin & Goetzel, P.C.

(57) ABSTRACT

This disclosure relates to techniques for a user equipment device (UE) performing a quasi-colocation (QCL) update in a wireless communication system. The UE may receive an indication to change a spatial relationship for transmission/reception. The UE may receive aperiodic reference signals for use in beam tracking according to the new spatial relationship. The UE may also receive provide aperiodic reference signals for time, frequency, and/or phase tracking. Thus, the UE may change to the new spatial relationship and use the aperiodic reference signals to quickly complete initial tracking operations.

14 Claims, 8 Drawing Sheets

(56) References Cited

U.S. PATENT DOCUMENTS

| | | | | |
|---|---|---|---|---|
| 2020/0119799 A1* | 4/2020 | Jung | .................... | H04B 7/0695 |
| 2020/0145158 A1* | 5/2020 | Zhou | .................... | H04L 5/0044 |
| 2020/0280416 A1* | 9/2020 | Gao | .................... | H04L 5/0051 |
| 2020/0288479 A1* | 9/2020 | Xi | ........................ | H04L 5/0092 |
| 2020/0351674 A1* | 11/2020 | Zhou | .................... | H04W 72/23 |
| 2021/0329517 A1* | 10/2021 | Noh | ........................ | H04B 7/088 |
| 2021/0376984 A1* | 12/2021 | Wei | ........................ | H04L 5/0053 |
| 2022/0131669 A1* | 4/2022 | Takeda | .................. | H04L 5/0048 |
| 2023/0171763 A1* | 6/2023 | Gao | .................... | H04W 52/08 |
| | | | | 370/329 |
| 2023/0188293 A1* | 6/2023 | Liu | .................. | H04W 56/0015 |
| | | | | 370/329 |
| 2023/0299900 A1* | 9/2023 | Gao | .................... | H04L 5/0023 |
| | | | | 370/330 |
| 2024/0147484 A1* | 5/2024 | Bai | ........................ | H04L 5/0092 |

FOREIGN PATENT DOCUMENTS

| | | | | |
|---|---|---|---|---|
| CN | 109586862 A | 4/2019 | | |
| CN | 111510267 A | 8/2020 | | |
| CN | 111656725 | 9/2020 | | |
| WO | 2019141011 A1 | 7/2019 | | |
| WO | WO-2020156174 A1 * | 8/2020 | ........... | H04B 7/0626 |

OTHER PUBLICATIONS

Ericsson "DL beam indication for periodic and aperiodic reference signals"; 3GPP TSG RAN WG1 #90 R1-1714291; Aug. 25, 2017.
Office Action for CN Patent Application No. 202080105225.7; Jul. 18, 2024.

\* cited by examiner

```
TCI-State ::=            SEQUENCE {
    tci-StateId              TCI-StateId,
    qcl-Type1                QCL-Info,
    qcl-Type2                QCL-Info
OPTIONAL,       -- Need R
    ...
}

QCL-Info ::=             SEQUENCE {
    cell                     ServeCellIndex
OPTIONAL,       -- Need R
    bwp-Id                   BWP-Id
OPTIONAL,       -- Cond CSI-RS-Indicated
    referenceSignal          CHOICE {
        csi-rs                   NZP-CSI-RS-ResourceId,
        ssb                      SSB-Index
    },
    qcl-Type                 ENUMERATED {typeA, typeB, typeC, typeD},
    ...
}
```

FIG. 9

USING APERIODIC REFERENCE SIGNALS FOR A SPATIAL RELATIONSHIP UPDATE

PRIORITY CLAIM INFORMATION

This application is a national stage application of International Application No. PCT/CN2020/115495, filed on Sep. 16, 2020, titled "Using Aperiodic Reference Signals for a Spatial Relationship Update", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications

TECHNICAL FIELD

The present application relates to wireless communication, including to spatial relationship update procedures for wireless devices in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing radio resource control connection procedures for remote wireless devices in a wireless communication system.

As noted above, the number of use cases for different classes of wireless devices with widely variable capabilities and usage expectations are growing. One direction in expansion of possible use cases may include increased use of beamforming by a wireless device to exchange data with a network. In order to reduce delay associated with a change in the spatial relationship (e.g., a new beam) used by a base station, a wireless device may receive aperiodic reference signals according to the new spatial relationship. The wireless device may use the aperiodic reference signals to update the beam used by the wireless device. Further, the wireless device may use the aperiodic reference signals for synchronization. Accordingly, the wireless device may rapidly adapt to the new spatial relationship, e.g., without waiting for periodic reference signals. Further, the wireless device may determine periodic reference signals (e.g., according to the new spatial relationship) to use for uplink power control and/or other functions.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 9 illustrates an example data structure for transmission control indicator, according to some embodiments.

Figure 1:
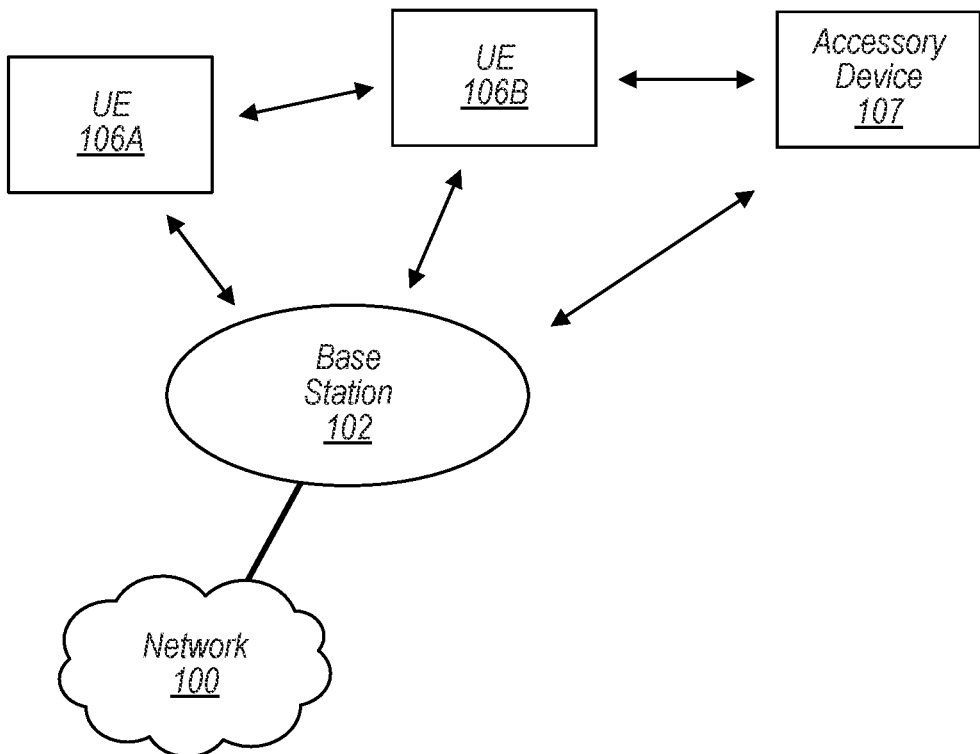
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
IoT: internet of Things
QCL: Quasi-Colocation
TCI: Transmission Configuration indicator
RRC: Radio Resource Control
MAC: Media Access Control
CE: Control Element
Tx: Transmission (or transmit)
Rx: Reception (or receive)
RS: Reference Signal
CSI: Channel State Information Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements. ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts. "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
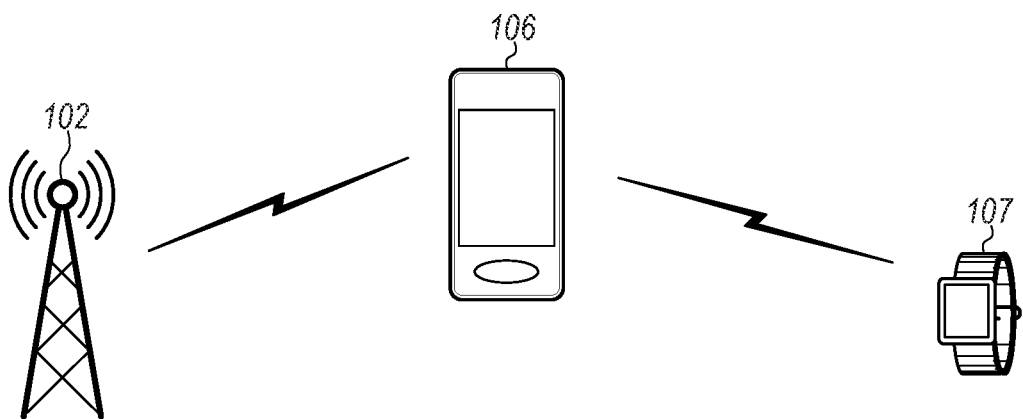
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, UAV, unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™M. Other configurations are also possible.

Figure 3:
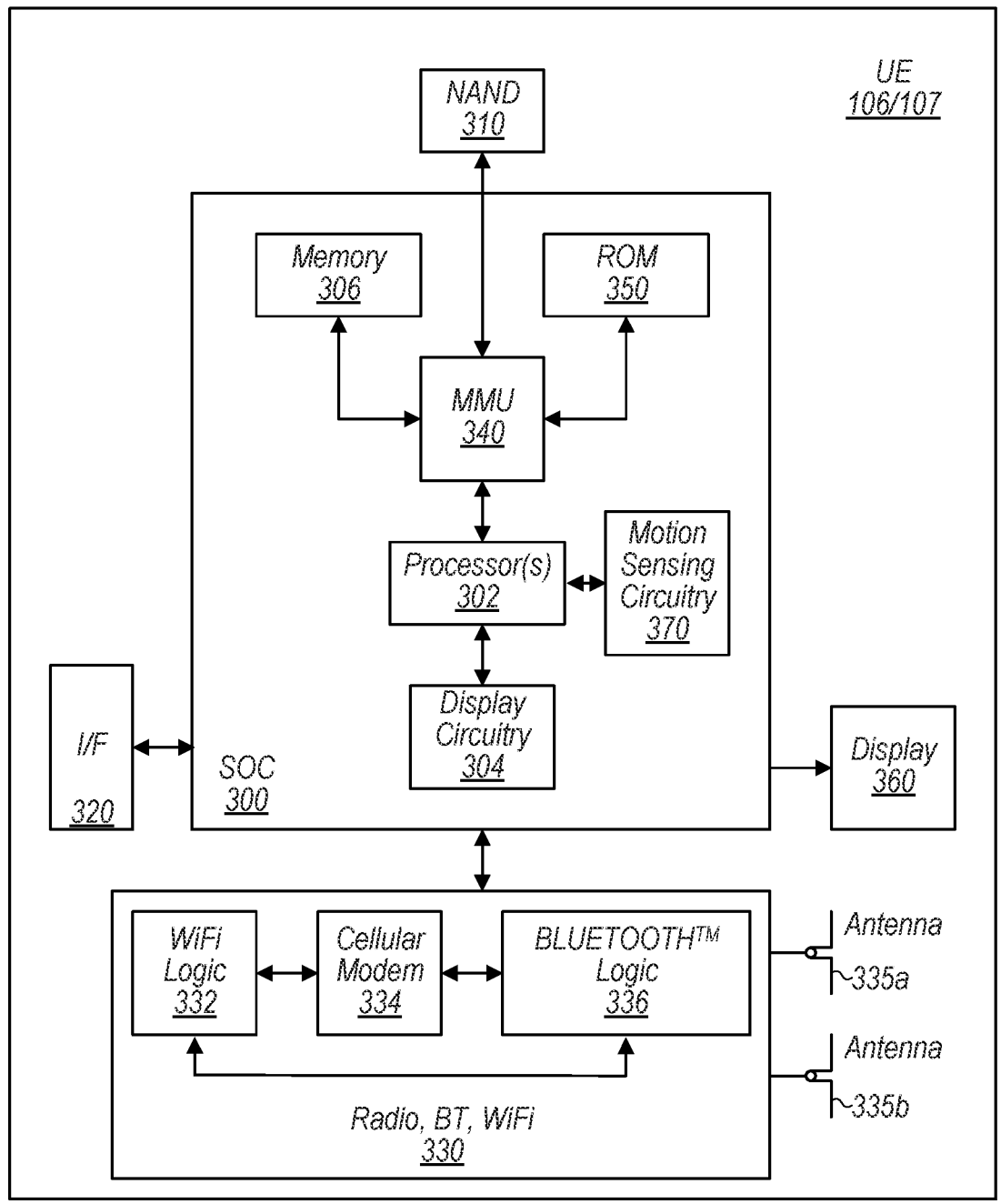
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
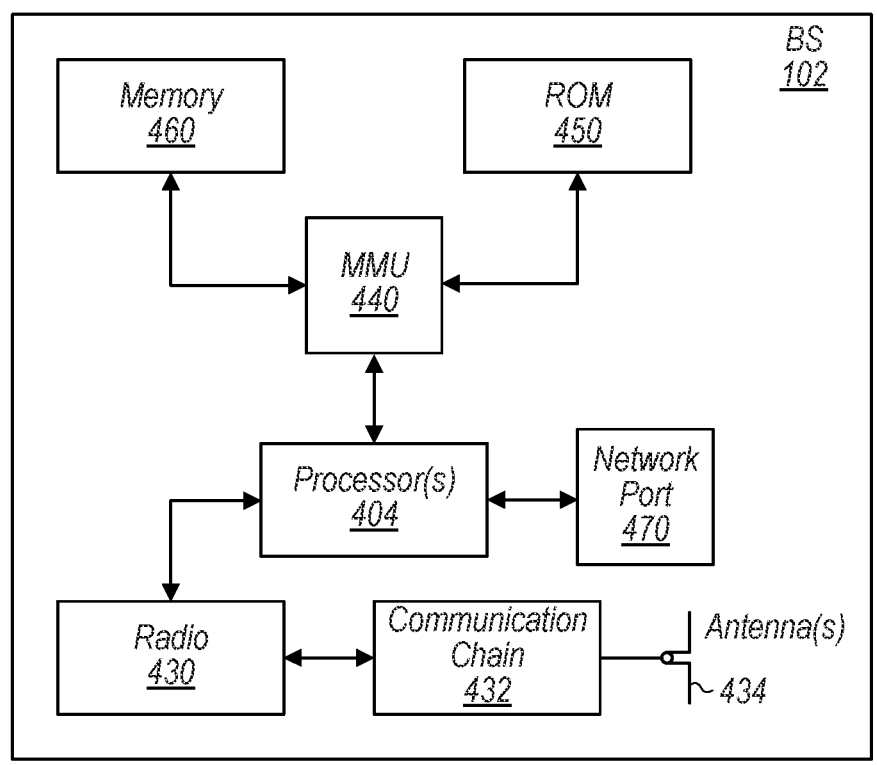
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000. UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
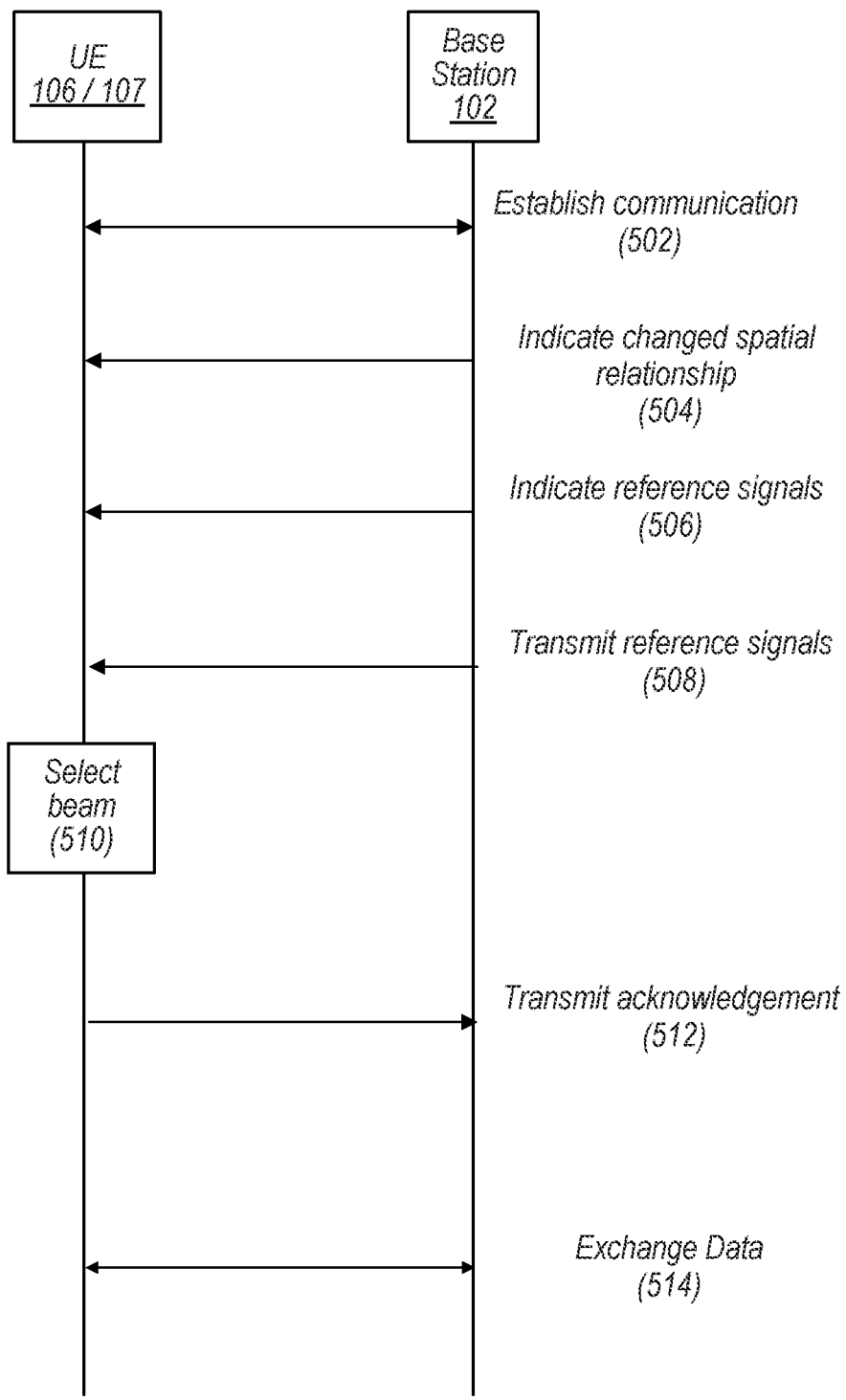
FIG. 5 is a communication flow diagram illustrating an exemplary method for performing QCL updates in a wireless communication system, according to some embodiments.

FIG. 5—Communication Flow Diagram

Reducing and/or avoiding latency and delays may be a priority in some wireless communication systems. In wireless communication systems that incorporate beamforming, one type of latency may be associated with changing or updating the spatial relationship and related transmission control between a BS and a UE. For example, if a BS updates a spatial relationship (e.g., selects a new transmission (Tx) beam to use for DL transmissions to the UE), the UE may perform measurements on reference signals associated with the new Tx beam. The measurements may include beam tracking measurements used by the UE to select a receive (Rx) beam to use to receive DL transmissions. Similarly, the beam tracking measurements may be used by the UE to select a Tx beam to use to transmit UL transmissions. Further, the measurements may include time, phase, and/or frequency offset measurements, which may be used by the UE to maintain synchronization with the network and/or other devices, such as an accessory device. If these measurements are performed using periodic reference signals, the delay between an indication of the new spatial relationship and the UE completing the measurements (e.g., and thus being ready for communication of user data using the new spatial relationship) may be considerable.

FIG. 5 is a communication flow diagram illustrating a method for performing updates of spatial relationships in a wireless communication system, according to some embodiments. The method of FIG. 5 may reduce the latency/delay associated with the update(s). In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device and/or a cellular base station, such as the UEs 106 or 107 and/or BS 102 illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

A UE and a BS may establish communication (502), according to some embodiments. The communication may be performed according to a first spatial relationship. For example, the first spatial relationship may include using a first Tx beam of the BS and using a first Rx beam of the UE for DL transmissions. Similarly, a first Rx beam of the BS and a first Tx beam of the UE may be used for UL transmissions. The beams used for DL transmissions may or may not correspond to the beams used for UL transmissions.

In some embodiments, the BS may configure the UE with multiple spatial relationships. For example, a spatial relationship may be specified by a transmission configuration indication (TCI) state. A TCI state may indicate a quasi-colocation (QCL) relationship between one or more of various (e.g., periodic) reference signals (RS) and the control and/or data channels (e.g., physical DL control channel (PDCCH) and/or physical DL shared channel (PDSCH) etc.) that the BS may use to transmit to the UE. Thus, the UE may use the RS (e.g., that is QCL with the control and/or data channels according to the TCI) to decode DL transmissions from the BS. The BS may use higher layer signaling (e.g., radio resource control (RRC)) to configure any number of TCI states and (e.g., later) use lower layer signaling (e.g., downlink control information (DC)) to select a TCI state to use.

In some embodiments, the UE may also establish communication with one or more other BSs (not shown in the figure). Such communication between the UE and multiple BSs may be referred to as multi-transmission/reception point (TRP) operation, e.g., a BS may be referred to as a TRP. The UE may have different spatial relationships with each BS, according to some embodiments. For example, the UE may use different Rx beams to receive data from each of the different BSs. In some embodiments, the UE may be able to receive from multiple BSs (e.g., using multiple Rx beams) simultaneously. However, the UE may only be able to transmit to a single BS at a time, according to some embodiments. In other words, a UE may use one Tx beam (e.g., which may point in a direction toward the BS) at a time, according to some embodiments. Accordingly, a single BS may be used for UL communication (e.g., at a time), according to some embodiments.

The UE may provide the network (e.g., the BS) with various capability information. For example, the UE may indicate how many Rx beams the UE is able to (e.g., or is currently configured to) use. Similarly, the UE may indicate its processing delay, e.g., how much time lapses between the UE receiving control signaling (e.g., DL control information (DC), etc.) and the implementation of the control signaling. For example, the processing delay may indicate the number of symbols between receiving an indication of a TC state and the UE being ready to receive RS according to the TCI state.

The UE and the BS(s) may communicate using one or more radio access technologies (RATs). e.g., NR. The UE and BS may exchange application and/or control data in the UL and/or DL directions. The communication and measurements may occur on any frequency or combination of frequencies, e.g., including licensed and/or unlicensed spectrum. The communication and measurements may continue (e.g., periodically, randomly, as needed, etc.) for any amount of time. For example, the communication and measurements may occur over any number of subframes and/or symbols. The measurements may include any radio link measurements such as signal-noise ratio (SNR), signal to interference and noise ratio (SINR), reference signal received power (RSRP), reference signal received quality (RSRQ), received signal strength indicator (RSSI), block error rate (BLER), bit error rate (BER), channel impulse response (CIR), channel error response (CER), etc. The UE and/or BS may retain a history of measurement values. The UE/BS may compare the measurement values, or metrics calculated based on the measured values, to one or more thresholds. The UE/BS may use various parameters, e.g., for hysteresis, in such comparisons. The measurements, thresholds, and/or parameters may be configured by the BS (e.g., by the network) and/or by the UE. The UE and/or BS may report measurement values (e.g., directly and/or as channel quality indicator (CQI), channel state information (CSI), etc.), comparison results, etc. to each other and/or to the network at any time.

Based on measurements, the UE and/or BS(s) may determine that changes in what beams are used may be beneficial. The UE may track RS associated with a current spatial relationship and perform measurements using those RS, among various possibilities.

The BS may determine to update the spatial relationship and may transmit an indication to the UE of the new spatial relationship (504), according to some embodiments. The updated to spatial relationship may be based on the various measurements, thresholds, and/or parameters discussed above. The indication may be or include a TCI, according to some embodiments.

In some embodiments, the BS may determine to update the spatial relationship for the UE with respect to one or more other BS as well. For example, the BS may receive an indication to update the spatial relationship for one or more other BS from another BS (e.g., via an X2 interface, e.g., which BSs may use for coordination) or from a network element. Alternatively, the BS may determine to update the relationship for one or more other BS based on its own measurements (e.g., indicating that the UE is moving, etc.). In other words, the BS may determine a change in position of the UE and use geometry to determine updated spatial relationships for itself and/or one or more other BS based on the change in the UE's position.

In some embodiments, the new spatial relationship(s) may have been previously configured (e.g., by RRC during 502). Accordingly, the new spatial relationships may be indicated as a reference (e.g., an index, etc.) to a previously configured spatial relationship, e.g., received in signaling from the BS. However, the UE may not have been previously tracking RS associated with the new spatial relationship(s).

The UE may receive the indication of the new spatial relationship(s). The UE may determine not to immediately acknowledge the indication. For example, the UE may determine to delay acknowledging the indication until the UE has completed one or more measurements (e.g., for beam selection, tracking, and/or refinement using aperiodic or periodic RS) according to the new spatial relationship(s).

The BS and/or other network element may schedule aperiodic RS for the new spatial relationship(s) and the BS may transmit an indication of the scheduled aperiodic RS to the UE (506), according to some embodiments. The aperiodic RS may be scheduled considering the processing delay of the UE, e.g., so that the first symbol of the RS may occur a threshold amount of time after the indication of the changed spatial relationship (e.g., 504).

Although illustrated as occurring subsequently to the indication of the changed spatial relationship (e.g., 504), it will be appreciated that this timing relationship is only one example. The indication of the scheduled aperiodic RS (e.g., 506) may occur prior to, concurrently with, or subsequently to the indication of the changed spatial relationship (e.g., 504). Similarly, the two indications (e.g., 504, 506) may be transmitted in the same or different message(s). The two indications may be transmitted in any combination of various types of messages. For example, DCI and/or MAC CE signaling may be used to transmit either or both of the indications.

In some embodiments, aperiodic RS associated with multiple new spatial relationships may be indicated (e.g., in one message/indication or in multiple messages/indications). For example, in the case of multi-BS operation, aperiodic RS may be scheduled for the different BSs. The aperiodic RS from the various BSs may be scheduled on the same time/frequency and/or at different time/frequency resources (e.g., or overlapping resources).

In some embodiments, the aperiodic RS may be channel state information (CSI) RS.

Sufficient repetitions of the aperiodic RS may be scheduled to allow the UE to perform beam tracking using the new spatial relationship(s). In other words, a first set of aperiodic RS may include one or more repetition (e.g., to be transmitted with the same Tx beam of the BS) for each Rx beam of the UE (e.g., as indicated by the UE in 502). For example, if a UE indicates that it has (or intends to select from) 8 Rx beams, the first set of aperiodic RS may include 8 or more repetitions.

In some embodiments, additional aperiodic RS may also be scheduled. For example, in addition to a first set of aperiodic RS (e.g., for beam tracking, as described above) a second set of aperiodic RS may be scheduled for the UE to perform tracking of time, frequency, and/or phase. In some embodiments, the second/additional set of aperiodic RS may be CSI-RS configured with tracking RS (TRS) information. For example, TRS may be a special type of CSI-RS (e.g., sometimes referred to as CSI-RS for tracking) described in section 5.1.6.1.1 of 3GPP 38.214. TRS may be configured via higher layer signaling, e.g., RRC, according to some embodiments. Thus, the second/additional set of aperiodic RS may be TRS.

The BS(s) may transmit the indicated (e.g., aperiodic) RS and the UE may receive the RS (508), according to some embodiments. For example, in the case of multi-BS operation, the BSs may each transmit the aperiodic RS on the scheduled time/frequency resources and the UE may receive the RS from the various BSs.

Based on the RS, the UE may select a beam (510), according to some embodiments. For example, the UE may perform measurements using its Rx beams, e.g., using a different Rx beam to receive the repetitions of the (e.g., first set of) aperiodic RS. Based on the measurements, the UE may select a Rx beam (e.g., with the best RSRP or other characteristics) for the new spatial relationship. In the case of multi-BS operation, the UE may select the same or different Rx beams for the different spatial relationships/BSs.

In some embodiments, the UE may also select a Tx beam for the new spatial relationship (e.g., or multiple Tx beams, in the case of multi-BS operation). The selected Tx beam(s) may or may not correspond to the selected Rx beam(s).

After receiving the aperiodic RS (e.g., and possibly after selecting the Rx beam(s)), the UE may transmit an acknowledgement of the indication of the changed spatial relationship (512), according to some embodiments. In other words, the delay for acknowledging the indication of the changed spatial relationship may conclude after receiving the RS. In some embodiments, the acknowledgement may be transmitted with a Tx beam according to the new spatial relationship.

In some embodiments, the acknowledgement may include or be transmitted with an indication of the selected Rx and/or Tx beam(s) of the UE. In some embodiments, such an indication may be transmitted separately.

It will be appreciated that the beam selection may be performed based on the aperiodic RS. Thus, the UE may not wait for periodic RS in order to perform the measurements and/or beam selection.

The UE and the BS(s) may exchange data using the new spatial relationship(s) (514), according to some embodiments. For example, DL transmissions may be made by the BS(s) using a Tx beam according to the new spatial relationship(s), and the UE may use the selected Rx beam(s) to receive the DL transmissions.

For UL transmissions, in the case of multi-BS operation, the UE may select a spatial relationship to use. For example, the UE may select to transmit UL transmissions to a particular one of the BSs, e.g., based on measurements of the aperiodic RS. In some embodiments, which BS the UE should use for UL transmissions may be configured by the network. In some embodiments, such an indication may be made flexibly (e.g., using DCI). In other embodiments, the indication may be made using higher layer signaling, e.g., MAC CE or RRC, etc.

The BS(s) may provide periodic RS, e.g., using the new spatial relationship(s). At least a subset of the periodic RS may share a QCL with the aperiodic RS, e.g., and QCL with the channels used for data exchange. The UE may use the periodic RS that share the QCL with the channels used for data exchange for pathloss measurement and UL power control.

FIGS. 6-9 and Additional Information

Figure 6:
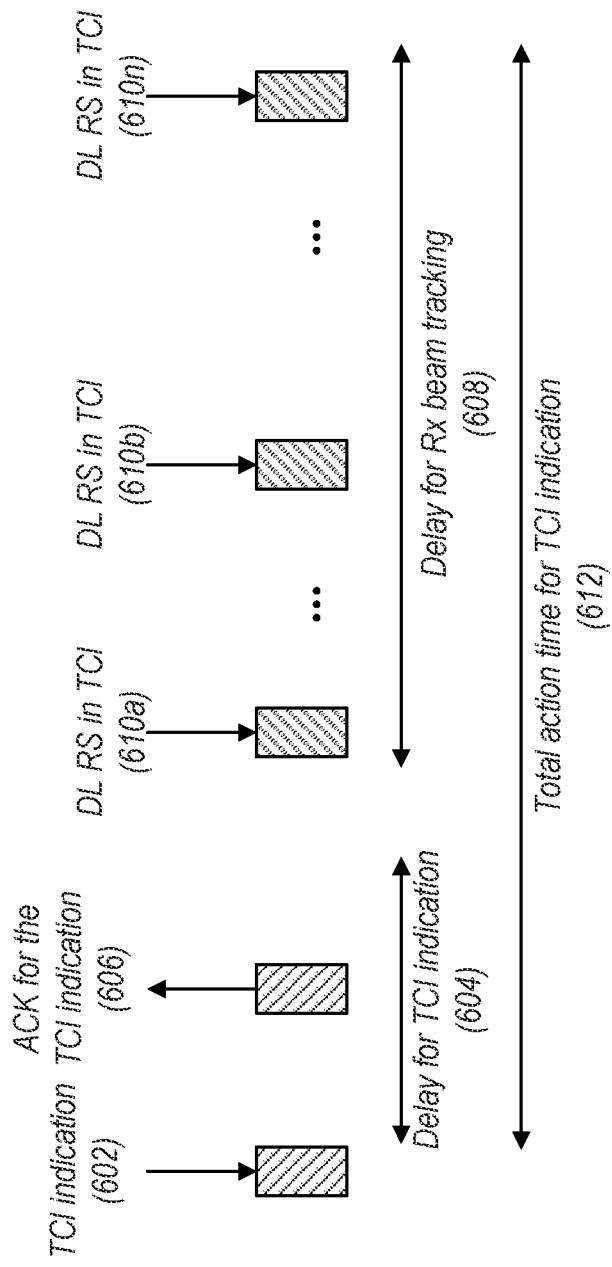
FIGS. 6-8 illustrates aspects of update indication and related signaling between a UE and a base station, according to some embodiments.
Figure 7:
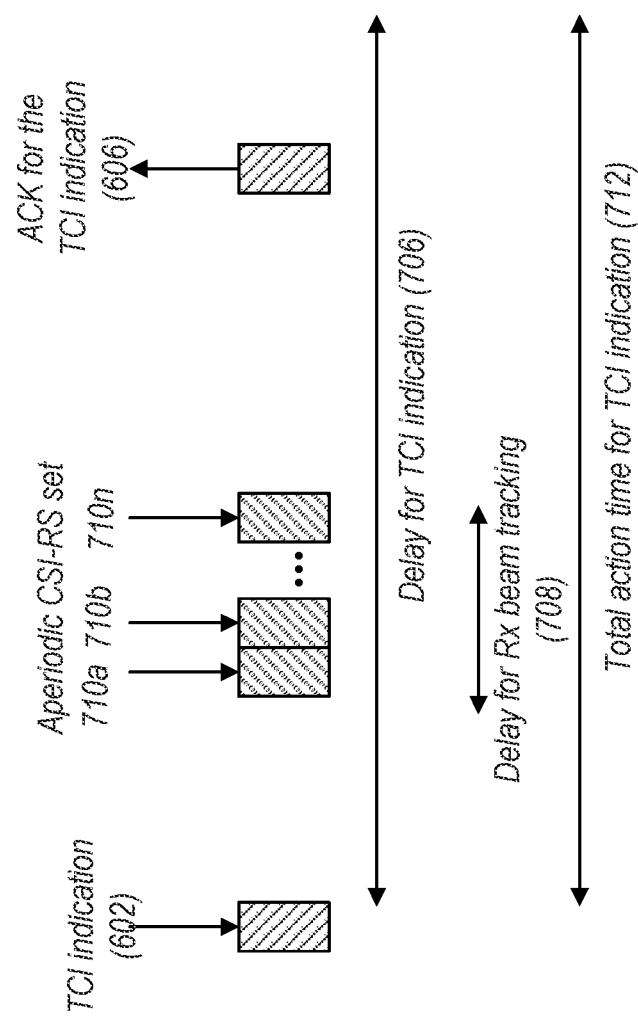
Figure 8:
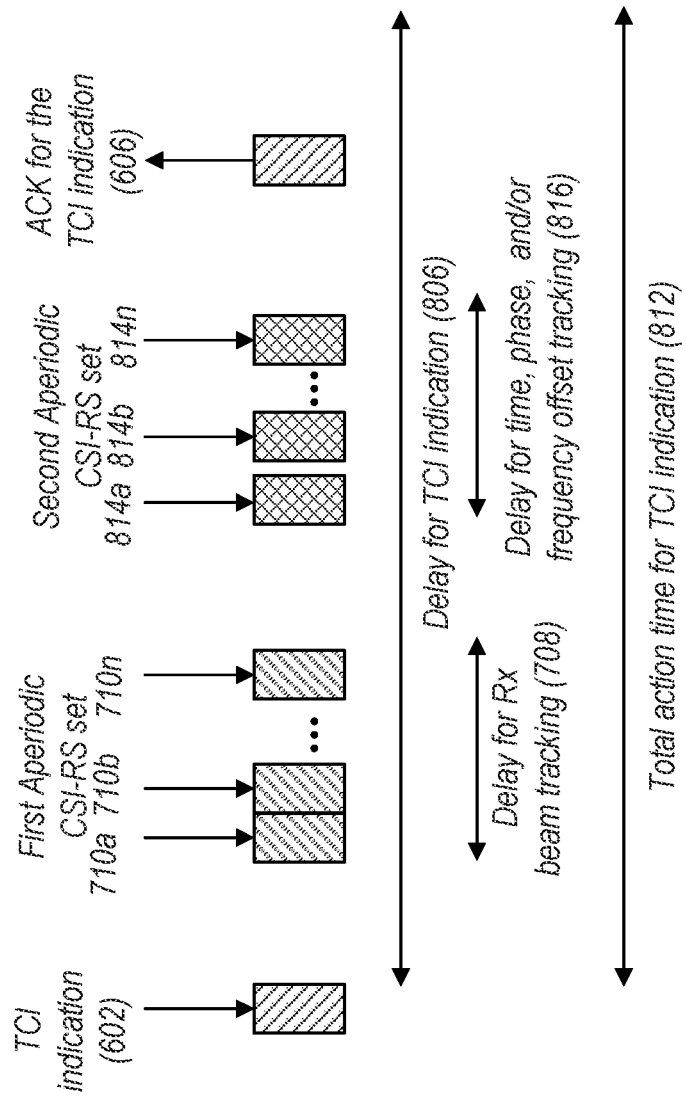

FIGS. 6-9 and the following additional information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure. It will be appreciated that the timelines of FIGS. 6-8 are not to scale.

FIG. 6 illustrates the delay associated with a spatial relationship update (e.g., via TCI update), according to some embodiments. The action time for a TCI indication 602 may vary by whether the new DL-RS (e.g., periodic RS that shares a QCL with the new TCI) in the TC is tracked by the UE or not, e.g., prior to the TC update. If the UE tracked this TCI, e.g. was previously configured to measure the new DL-RS and report a CSI based on the new DL-RS, the action time may be based (e.g., only) on the processing delay to decode the control signaling for TCI indication 604. Such a delay may be relatively short, e.g., may end with the acknowledgement (ACK) for the TCI indication 606.

However, if the UE has not tracked this TCI, the action time may be based on the processing delay to decode the control signaling 604 for TCI indication as well as the tracking latency 608. For a UE with multiple Rx beams, the UE perform measurements of multiple DL RS 610a-610n using the new spatial relation, e.g., to find out the best Rx beam based on multiple measurements. In other words, using a series of (e.g., periodic) RS transmitted by the BS using the new spatial relationship, the UE may take measurements of the instances of the RS using different Rx beams in sequence. Thus, the total action time (e.g., total delay) 612 may be equal to 604 plus 608. The series of periodic RS may be transmitted on a regular basis by the base station, but there may be significant time in between each transmission of the periodic RS. Accordingly, the tracking latency 608 may be based in part on the amount of time between the periodic RS transmissions.

However, according to the method of FIG. 5, aperiodic CSI-RS (or other RS) may be used to update the QCL to reduce the beam indication latency. This may be achieved by using TCI indication signaling (or associated signaling) to trigger aperiodic CSI-RS. The QCL indication for the aperiodic CSI-RS may be indicated in the new TC state. Further, pathloss reference signal for uplink power control may be explicitly indicated in the signaling or may be implicitly signaled. Further, the QCL indication may be extended for multi-TRP operation.

FIG. 7 illustrates the delay associated with a spatial relationship update (e.g., via TCI update), according to some embodiments. e.g., incorporating aperiodic RS to reduce the delay. As shown, the network may trigger aperiodic CSI-RS and the TCI indication signaling at the same time (e.g., or at similar times) to reduce QCL indication latency. One or more of the resources in the aperiodic CSI-RS resource set (710a-710n) may be indicated in the new TCI. For example, the indication may specify the time and frequency of the first repetition of the aperiodic CSI. The aperiodic CSI-RS resource set may be configured with repetition=on, which means the base station may transmit the CSI-RS resources from the same port (e.g., using the same beam). It will be appreciated that in FIG. 7, the aperiodic RS may be transmitted in rapid succession (e.g., one repetition may closely or immediately follow the previous repetition). This may be a contrast to periodic RS (e.g., as illustrated in FIG. 6) for which there may be time in between the successive instances of the periodic RS. Thus, using the aperiodic RS may allow the UE to perform measurements with each beam in less time than performing similar measurements using periodic RS (e.g., 708 may be shorter than 608). Since the beam tracking may be performed prior to acknowledging the TCI indication, the total action time 712 may be equal to the delay for TC indication 706. However, it will be appreciated that 706 may be longer than 606, according to some embodiments.

FIG. 8 illustrates the incorporation of a second set of aperiodic RS (814a-814n), e.g., for time, phase, and/or frequency tracing, according to some embodiments. As shown, the BS may trigger one or more additional CSI-RS resource set used for time/frequency offset tracking and/or phase offset tracking with the new QCL assumption. The additional CSI-RS resource set(s) may be transmitted after the first CSI-RS resource set for beam tracking. Thus, the UE may select a Rx beam (e.g., based on measurements using the first CSI-RS resource set 710a-710n) and then perform time, frequency, and/or phase tracking using the additional CSI resource set(s) 814a-814n. The second CSI-RS resource set may be configured for tracking, e.g., as TRS.

In some embodiments, the additional CSI resource set(s) 814a-814n may be multiplexed in 1 or 2 slots with a 3 symbol gap between resources. For example, TRS may be multiplexed in symbol {4, 8} in a slot, or symbol {4, 8}{4, 8} in two consecutive slots, among various possibilities. It will be appreciated that other multiplexing arrangements (e.g., in different symbols and/or with different gaps, including no gap, between symbols) may be used as desired.

Thus, the total action time 812 may be equal to the sum of the delay for beam tracking 708 and the delay for time, frequency, and/or phase tracking 816. Since the beam tracking and time, frequency, and/or phase tracking may be performed prior to acknowledging the TCI indication, the total action time 812 may be equal to the delay for TC indication 806. However, it will be appreciated that 806 may be longer than 606 or 706, according to some embodiments.

FIG. 9 illustrates a TCI state, e.g., as may be used according to 3GPP TS 38.331, among various possibilities. As shown, QCL information may be provided according to one or more QCL types for one or more cells (e.g., BSs).

In standards documents, (e.g., 3GPP Release-15), the following QCL types may be defined (see, e.g., 5.1.5 in 38.214):

'QCL-TypeA': {Doppler shift, Doppler spread, average delay, delay spread},

'QCL-TypeB': {Doppler shift, Doppler spread},

'QCL-TypeC': {Doppler shift, average delay}, and

'QCL-TypeD': {Spatial Rxparameter}.

The BS may update the QCL for DL signals by transmission configuration indication (TC). A UE may be configured with a number of TC states by RRC. A BS may use lower layer signaling, e.g., MAC CE or DCI, to select one of the TC states. In some embodiments, a BS may provide DL RS as the QCL source for a TC state. In other words, periodic RS transmitted by the BS may be used by any UEs associated with a TCJ state that shares a QCL with the periodic RS. For example, a QCL source in a TC state (e.g., used for a DL channel) may be a periodic RS in the TC state which shares a QCL with the DL channel.

In some embodiments, the TCI state may also be used for UL signals and channel for UE to derive the Tx beam for UL signals. In other words, the UE may use the DL RS indicated in the TCI State as the reference to derive the Tx beam. In one example, UE may use the same beam to transmit UL signal as that to receive DL signal. This reference signal may also be used for pathloss measurement to derive the UL transmission power, e.g., according to the rules defined in section 7 in TS 38.213.

With regard to beam tracking for further communication (e.g., in 514), the first CSI-RS resource set (e.g., the first aperiodic RS, e.g., discussed with respect to 506, 508, and 510 and illustrated in FIG. 7) may be QCLed (e.g., may share a QCL) with a periodic reference signal. The periodic reference signal may be synchronization signal block (SSB) or CSI-RS, among various possibilities. The periodic reference signal may be in the same component carrier (CC) or in a different CC. The QCL may be based on at least one of the following parameters: Doppler shift. Doppler spread, average delay, delay spread, spatial Rx parameter, and average channel gain. Thus, the network (e.g., or BS) may determine any one or more of these parameters, and based on the determination, may select the RS and/or TCI. In one example, the aperiodic RS and the corresponding downlink/uplink channel may share the same TC indication, where the source RS in the TCI state may be a periodic RS. In another example, the aperiodic RS may be configured as the source RS in the TCI state applied for the corresponding downlink/uplink channel, and the aperiodic RS may be indicated with a TCI state with a periodic RS as the QCL source. The second aperiodic CSI-RS resource set may share the same QCL properties as the first aperiodic CSI-RS resource set (e.g., with respect to FIGS. 8, 710 and 814 may share QCL).

It will be appreciated that the control signaling for TC indication may be performed in various ways. Example details of three options for the control signaling are explained below, according to some embodiments.

In a first option, the TC indication and the triggering of aperiodic CSI-RS resource set may be carried by the same DCL. In some embodiments, the DCI may include at least the following two fields:

TCI indication. The BS may indicate one of the TCI States configured in higher layer, e.g. RRC or MAC CE.

CSI request. The BS may trigger one or two aperiodic CSI-RS resource set based on the resource sets configured by RRC.

Ina second option, the TCI indication may be carried by MAC CE and the triggering of aperiodic CSI-RS resource set may be carried by the DCI used to trigger the PDSCH for the same MAC CE. For example, a DCI may trigger aperiodic RS and may schedule a MAC CE in a PDSCH. The MAC CE may include the TC indication. In some embodiments, the DCI may include at least the following field: CSI request. The BS may trigger one or two aperiodic CSI-RS resource set based on the resource sets configured by RRC. In the MAC CE, BS may indicate one of the TCI States configured by RRC.

In a third option, the TCI indication and the triggering of aperiodic CSI-RS resource set may be carried by a MAC CE or separate MAC CEs. For example, in a MAC CE, the BS may trigger one or two aperiodic CSI-RS resource set based on the resource sets configured by RRC. Further, in the MAC CE, BS may indicate one of the TC States configured by RRC.

For any of the signaling options discussed above, the triggering offset between the last symbol of the triggering signaling and the first symbol of aperiodic CSI-RS resource set may be larger than a threshold reported by the UE. This may accommodate the processing delay for UE to decode the triggering signaling. For example, based on UE capability information, the network/BS may ensure that sufficient time is available for the UE to process the TC indication and be ready to receive the RS using an Rx beam according to the indicated TCI.

For any of the signaling options discussed above, the number of CSI-RS resources (or other aperiodic RS) in a (e.g., first) resource set (e.g., 710a-710n) should be no less than a number reported by the UE. For example, based on UE capability information, the network/BS may ensure that sufficient repetitions are in the first RS set for the UE to receive one (or more) repetition with each Rx beam of the UE. In other words, the number of repetitions may be greater than or equal to the number of Rx beams of the UE.

One change associated with changing to a new spatial relationship, e.g., a new TCI, is that the UE may use different periodic RS for pathloss measurement and UL power control. The BS/network may implicitly or explicitly indicate (e.g., and the UE may determine) the RS to be used for pathloss measurement (e.g., following the change in spatial relationship) in various ways. For example, if there is no additional pathloss RS explicitly indicated, the pathloss measurement for the uplink signal, which the new TCI State is applied to, may be based on a periodic reference signal, which is configured as the QCL source of the aperiodic CSI-RS. Thus, the UE may determine to perform pathloss measurement using a periodic RS that shares QCL with the aperiodic RS. In one example, if the BS triggers aperiodic CSI-RS resource set 1 in a TCI switching signaling, and the resources in the aperiodic CSI-RS resource set 1 is QCLed with SSB 1, the SSB 1 may be used as the pathloss reference signal. Alternatively, BS may explicitly indicate the new pathloss reference signal by the control signaling for TCI switching. In one example, BS may indicate the pathloss reference signal index by DCI or MAC CE, which is selected from the pathloss reference signal pool configured by RRC. In another example, a BS/network may determine that a first set of periodic RS (e.g., SSB 1) is QCL with the aperiodic CSI-RS. In response to the determination that the first set of periodic RS is QCL with the aperiodic CSI-RS, the BS/network may determine not to explicitly indicate a pathloss RS. The UE may determine based on the lack of explicit indication of a pathloss RS, to use the first set of periodic RS, e.g., based on the first set of periodic RS being QCL with the aperiodic CSI-RS.

Further, as discussed above, the method of FIG. 5 may be applied in the case of a UE in communication with multiple BSs simultaneously. For multi-TRP operation, BS may indicate more than 1 TCI States, e.g. 2 TCI State. The UE may receive the TCI States simultaneously by multiple panels (e.g., of antennas). The network may trigger two or more aperiodic CSI-RS resource sets for beam tracking for each UE panel. For example, each of the BSs may transmit one set of aperiodic RS for each panel of the UE. For example, if a UE has 2 panels and each panel has 8 Rx beams, each BS may transmit 2 sets of aperiodic RS for beam tracking and each set of aperiodic RS may have 8 repetitions. Thus, 16 total repetitions (for each BS) may be transmitted, corresponding to the 16 total Rx beams of the UE. Similarly, the network may trigger another two or more (e.g., one or more from each BS) aperiodic CSI-RS resource sets for time/frequency offset tracking for each UE panel.

The CSI-RS resource sets with the same functionality may be transmitted in overlapped symbols or non-overlapped symbols, which may be based on a UE capability. In other words, aperiodic RS for beam tracking may be transmitted by different BSs at the same, different, or partly overlapping times. However, the aperiodic RS for time, frequency, and/or phase tracking may be transmitted subsequently to the aperiodic RS for beam tracking. The aperiodic RS for time, frequency, and/or phase tracking may be transmitted by multiple BSs at the same time, different times, or partly overlapping times.

In some embodiments, a UE may support one antenna panel for uplink transmission but two panels for downlink reception. Thus, UE may receive 2 TCI States but may only use (or be indicated with) 1 TCI State for uplink transmission. If the TCI switching signaling is applied for both UL and DL channel, when 2 TCI States are indicated, the UE may select one of the TCI State for uplink channel. For example, the UE may select a first TCI State, e.g., associated with a first BS or may select a second TC State, e.g., associated with a second BS. In some embodiments, the UE may perform this selection based on measurements (e.g., selecting the BS with lower pathloss, and thus lower transmit power requirements). In some embodiments, the network may select which TC state should be used and may configure the UE accordingly, e.g., by DCI or higher layer signaling, e.g. MAC CE or RRC.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   a radio; and
   a processor operably connected to the radio and configured to cause the UE to:
      establish communication with a first base station according to a first transmission control state;
      receive, from the first base station an indication to use a second transmission control state and an indication of first aperiodic reference signals, wherein the indication to use the second transmission control state includes an indication of a pathloss reference signal index, wherein the indication to use the second transmission control state includes an indication to use a third transmission control state associated with a second base station;
      receive, from the first base station, periodic reference signals according to the pathloss reference signal index;
      perform pathloss measurements based on the periodic reference signals;

receive, from the first base station, the first aperiodic reference signals according to the second transmission control state;
perform measurements of the first aperiodic reference signals;
select, based on the measurements of the first aperiodic reference signals, a receive beam for use according to the second transmission control state; and
transmit an acknowledgement of the indication to use the second transmission control state, wherein the acknowledgement is transmitted after the first aperiodic reference signals are received.

2. The UE of claim 1, wherein the processor is further configured to cause the UE to:
determine whether an indication of reference signals for pathloss measurement according to the second transmission control state is received from the first base station.

3. The UE of claim 2, wherein the processor is further configured to cause the UE to:
in response to a determination that no indication reference signals for pathloss measurement according to the second transmission control state is received:
determine first periodic references signals that share a quasi-colocation (QCL) with the first aperiodic reference signals.

4. The UE of claim 3, wherein the processor is further configured to cause the UE to:
receive, from the first base station, the first periodic references signals; and
perform pathloss measurement using the first periodic reference signals.

5. The UE of claim 4, wherein the first periodic reference signals comprise a synchronization signal block.

6. The UE of claim 1, wherein the processor is further configured to cause the UE to:
receive, from the second base station, second aperiodic reference signals according to the second transmission control state;
perform measurements of the second aperiodic reference signals;
select, based on the measurements of the second aperiodic reference signals, a second receive beam for use according to the third transmission control state; and
select, one of the second transmission control state or the third transmission control state, for uplink communication.

7. An apparatus, comprising:
a processor configured to, when executing instructions stored in a memory, perform operations comprising:
establish communication with a first base station according to a first transmission control state;
receive, from the first base station an indication to use a second transmission control state and an indication of first aperiodic reference signals, wherein the indication to use the second transmission control state includes an indication of a pathloss reference signal index, wherein the indication to use the second transmission control state includes an indication to use a third transmission control state associated with a second base station;
receive, from the first base station, periodic reference signals according to the pathloss reference signal index;
perform pathloss measurements based on the periodic reference signals;
receive, from the first base station, the first aperiodic reference signals according to the second transmission control state;
perform measurements of the first aperiodic reference signals;
select, based on the measurements of the first aperiodic reference signals, a receive beam for use according to the second transmission control state; and
transmit an acknowledgement of the indication to use the second transmission control state, wherein the acknowledgement is transmitted after the first aperiodic reference signals are received.

8. The apparatus of claim 7, the operations further comprising:
determine whether an indication of reference signals for pathloss measurement according to the second transmission control state is received from the first base station.

9. The apparatus of claim 8, the operations further comprising:
in response to a determination that no indication reference signals for pathloss measurement according to the second transmission control state is received:
determine first periodic references signals that share a quasi-colocation (QCL) with the first aperiodic reference signals.

10. The apparatus of claim 9, the operations further comprising:
receive, from the first base station, the first periodic references signals; and
perform pathloss measurement using the first periodic reference signals.

11. The apparatus of claim 10, wherein the first periodic reference signals comprise a synchronization signal block.

12. The apparatus of claim 7, the operations further comprising:
receive, from the second base station, second aperiodic reference signals according to the second transmission control state;
perform measurements of the second aperiodic reference signals;
select, based on the measurements of the second aperiodic reference signals, a second receive beam for use according to the third transmission control state; and
select, one of the second transmission control state or the third transmission control state, for uplink communication.

13. A method, comprising:
establish communication with a first base station according to a first transmission control state;
receive, from the first base station an indication to use a second transmission control state and an indication of first aperiodic reference signals, wherein the indication to use the second transmission control state includes an indication of a pathloss reference signal index, wherein the indication to use the second transmission control state includes an indication to use a third transmission control state associated with a second base station;
receive, from the first base station, periodic reference signals according to the pathloss reference signal index;
perform pathloss measurements based on the periodic reference signals;
receive, from the first base station, the first aperiodic reference signals according to the second transmission control state;
perform measurements of the first aperiodic reference signals;

select, based on the measurements of the first aperiodic reference signals, a receive beam for use according to the second transmission control state; and transmit an acknowledgement of the indication to use the second transmission control state, wherein the acknowledgement is transmitted after the first aperiodic reference signals are received.

14. The method of claim 13, further comprising:

receive, from the second base station, second aperiodic reference signals according to the second transmission control state;

perform measurements of the second aperiodic reference signals;

select, based on the measurements of the second aperiodic reference signals, a second receive beam for use according to the third transmission control state; and select, one of the second transmission control state or the third transmission control state, for uplink communication.

* * * * *